Patented Feb. 6, 1923.

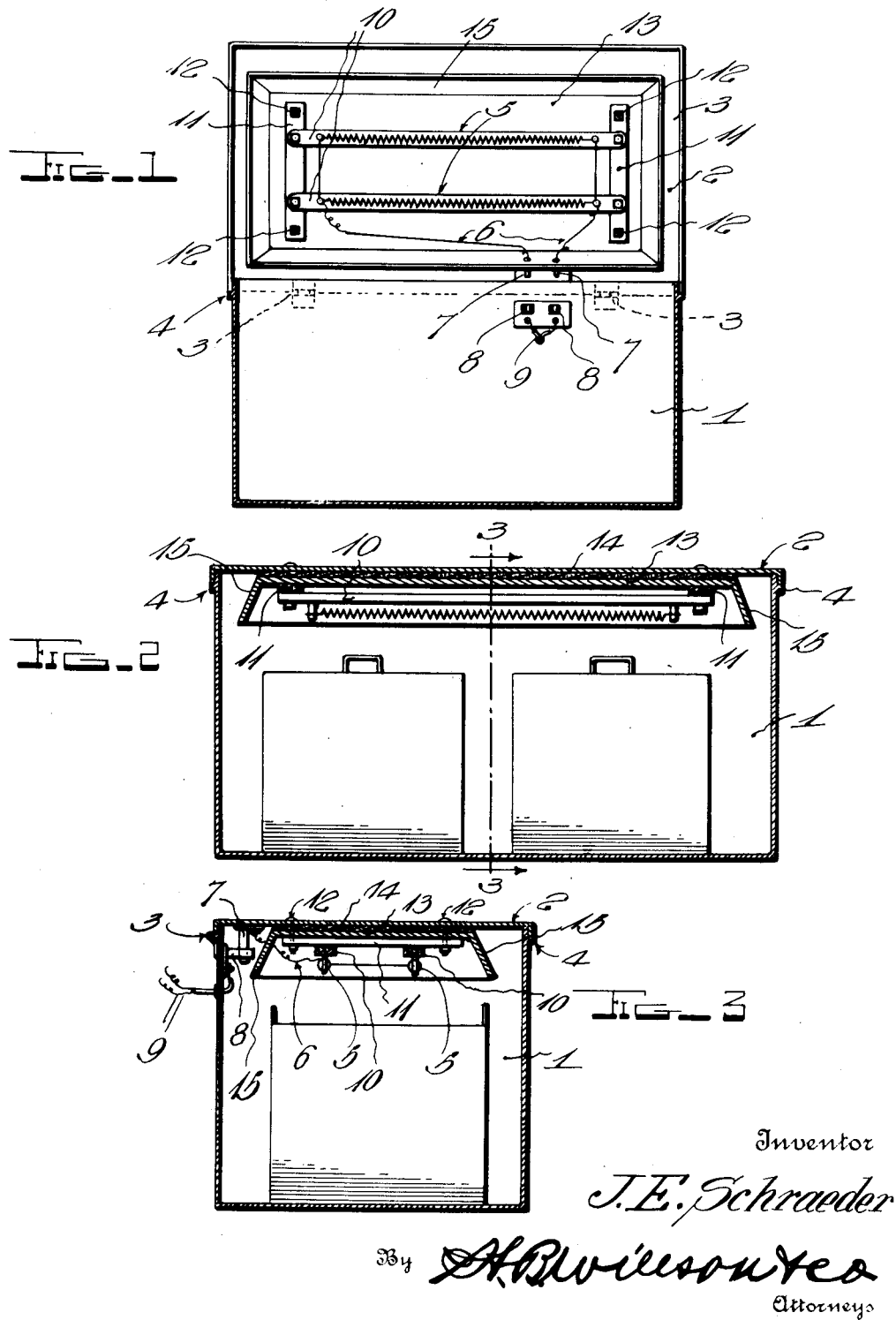

1,444,561

UNITED STATES PATENT OFFICE.

JOSEPH EDWARD SCHRAEDER, OF CROOKSTON, MINNESOTA.

ELECTRIC BATTERY HEATER.

Application filed January 12, 1922. Serial No. 528,704.

*To all whom it may concern:*

Be it known that I, JOSEPH E. SCHRAEDER, a citizen of the United States, residing at Crookston, in the county of Polk and State of Minnesota, have invented certain new and useful Improvements in Electric Battery Heaters; and I do declare the following to be a full, clear, and exact description of the invention, such as will enable others skilled in the art to which it appertains to make and use the same.

My invention aims to provide a simple and inexpensive, yet a highly efficient and desirable device for heating storage batteries before dismantling them for repairs, so as to soften the usual plastic covering of the cells and permit it to be removed. In carrying out this end, I employ a box or casing to receive one or more batteries, said box or casing being provided with a movable top, and a further object is to mount an electrical heater directly upon this top so that when it is closed, the heater will be properly positioned over the battery to effectively soften the plastic covering of the cells. In this connection, a further aim is to provide for automatically closing the circuit of the electric heater when the cover is closed.

Yet another object is to provide a novel heat reflector for directing the rays of heat downwardly onto the battery or batteries.

With the foregoing in view, the invention resides in the novel subject matter hereinafter described and claimed, the description being supplemented by the accompanying drawings.

Figure 1 is a longitudinal section of my invention with the cover swung to a vertical position.

Figure 2 is a vertical longitudinal section with the cover closed.

Figure 3 is a vertical transverse sectional view as indicated by line 3—3 of Fig. 2.

In the drawing above briefly described, the numeral 1 designates a suitably shaped casing having immovable sides and bottom but provided with a cover 2 preferably hinged at 3 or otherwise mounted so that it may be moved out of position to allow one or more batteries to be placed in the casing. The cover 2 is in most instances provided with a peripheral flange 3 to take over the upper edge of the casing 1 and the walls of said casing may well be provided with a bead 4 upon which the flange rests when the cover is closed, thereby forming a connection which will not easily permit heat to escape from the casing.

An electric heater, here shown as consisting of two units 5, is mounted on the lower side of the cover 2 and lead wires 6 extend to the terminals of said heater from a pair of movable contacts 7 carried by the cover, said contacts being adapted to engage fixed contacts 8 to which current supply wires 9 are connected. By this arrangement, when the cover 2 is closed, the contacts 7 engage the fixing contacts 8 and the circuit of the electric heating units 5 is completed, so that they will immediately come into play to soften the sealing composition of the battery or batteries within the casing. The moment the cover 2 is opened however, the circuit of the heating elements is automatically broken so that no waste current takes place.

In the preferred form of construction, the heating elements 5 are mounted on the lower sides of a pair of spaced longitudinal bars of insulation 10 and the ends of these bars are in turn secured to transverse insulating bars 11 which are bolted or otherwise secured to the top 2 as indicated at 12. Between the bars 11 and the top 2, I have shown a heat reflecting plate 13 and a sheet of asbestos or the like 14 which insulates the plate 13 from said top. The edge portion of the plate 13 is provided with a downwardly extending continuous flange 15 which is preferably flared in the manner shown. The plate 13 and flange 15 serve to intensify the heat from the units 5 by radiating the same downwardly upon the contents of the casing 1.

By constructing the device in or substantially in the manner shown and described, it may be easily and inexpensively manufactured, yet will fulfill a long felt need in battery repair shops in which the usual sealing material for the batteries is often heated in very crude ways in order that it may be removed to gain access to the cells and their contents. Since excellent results may be obtained from the details disclosed, they may be followed if desired, but I wish it understood that within the scope of the invention as claimed, numerous minor changes may be made.

I claim:

1. A device for melting the sealing medium on the top of a storage battery, comprising a casing having a cover movable aside when inserting the battery, and an electric heater carried by the lower side of said cover to extend over and heat the battery sealing means when said cover is closed.

2. A structure as specified in claim 1, together with means for automatically completing the circuit of said electric heater when the cover is closed.

3. A device for melting the sealing means on the top of a storage battery, comprising a casing having a cover movable aside when inserting the battery, a heat radiating plate at the lower side of and carried by said cover, the edge portion of said plate being provided with a downwardly extending heat radiating flange, and an electric heater carried by said cover and positioned at the lower side of said plate, said heater being adapted to extend over and heat the battery sealing means when said cover is closed.

In testimony whereof I have hereunto set my hand.

JOSEPH EDWARD SCHRAEDER.